United States Patent
Takazawa

(10) Patent No.: US 7,062,776 B2
(45) Date of Patent: Jun. 13, 2006

(54) OPTICAL DISK

(75) Inventor: Koji Takazawa, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 301 days.

(21) Appl. No.: 10/448,213

(22) Filed: May 30, 2003

(65) Prior Publication Data

US 2003/0223350 A1 Dec. 4, 2003

(30) Foreign Application Priority Data

May 31, 2002 (JP) ............................. 2002-158897

(51) Int. Cl.
*G11B 7/24* (2006.01)

(52) U.S. Cl. ..................................... 720/718

(58) Field of Classification Search ................. 720/718
See application file for complete search history.

(56) References Cited

U.S. PATENT DOCUMENTS 5,516,568 A * 5/1996 Jung .......................... 428/64.1
6,775,839 B1 * 8/2004 O'Brien ....................... 720/718

FOREIGN PATENT DOCUMENTS

JP 5-81701 4/1993

* cited by examiner

*Primary Examiner*—David Davis
(74) *Attorney, Agent, or Firm*—Pillsbury Winthrop Shaw Pittman, LLP

(57) ABSTRACT

An optical disk having a recording layer on a substrate, a bonding layer which is made of an ultraviolet cured resin bonding the recording layer, a transparent layer which is bonded to the bonding layer, and an overcoating layer which is formed on the transparent sheet and is made of the ultraviolet cured resin further has a mixed layer which is formed by mixing the ultraviolet cured resins of the bonding layer and the overcoating layer. Consequently, the bonding layer, the overcoating layer, and the mixed layer are integrally cured, so that the substrate is entirely covered with the ultraviolet cured resin having transparency, which allows a light transmitting layer A to be protected with sufficient strength.

9 Claims, 5 Drawing Sheets

_US 7,062,776 B2_

OPTICAL DISK

CROSS-REFERENCE TO RELATED APPLICATIONS

This application is based upon and claims the benefit of priority from the prior Japanese Patent Application No. 2002-158897, filed May 31, 2002, the entire contents of which are incorporated herein by reference.

BACKGROUND OF THE INVENTION

1. Field of the Invention

The present invention relates to an optical disk in which a laser beam is irradiated from a light transmitting layer side provided on a substrate to record and reproduce information, particularly relates to the optical disk in which a protective layer for the light transmitting layer is provided and a method of manufacturing the same.

2. Description of the Related Art

Recently, an optical recording medium such as an optical disk is becoming commonplace, for example, in DVD (Digital Versatile Disk) or DVD-R for a DVD apparatus, a laser beam is irradiated from a backside of a substrate to record and reproduce information. However, in the next-generation DVD apparatus or the like, recording and the reproducing are performed in such a manner that a recording layer is formed on the face of the substrate, a light transmitting layer is provided on the recording layer, and the laser beam is irradiated from a frontside of the disk.

That is, in the optical disk, the recording layer (a deposited layer which directly involves the recording, erasing, and reproducing characteristics of a phase change type of optical disk such as a reflecting film, a dielectric material film, and a phase change film) is formed on a transparent plastic substrate in which a guide groove is formed by an injection molding method or the substrate made by a so-call 2P method, and the light transmitting layer (a bonding film made of ultraviolet cured resin and a transparent sheet) is formed on the recording layer. Usually, the recording layer is formed by a sputtering method, and the light transmitting layer is formed in such a manner that resin liquid is applied on the substrate and the recording layer with a spin coat method and is hardened, and the transparent sheet is fixed.

However, when the light transmitting layer is formed up to an outermost peripheral end of the substrate, external force of handling causes a problem such as easy separation. The reason is as follows. That is, it is necessary that the light transmitting layer is larger than the recording layer in order to protect the recording layer. The light transmitting layer has a thickness of about 100 μm and requires to be covered with the transparent sheet having excellent evenness, because it is necessary that birefringence is decreased and the thickness is uniformed on the entire periphery surface of the substrate. However, in the case of adopting the above-described structure, since the outermost peripheral end portion of the transparent sheet constituting the light transmitting layer is as thick as 100 μm, it is easy to generate a step at the outermost peripheral end portion of the substrate. In some cases, the transparent sheet is separated by getting hitched during the handling, so that the recording layer has a possibility of being broken.

With reference to the method of manufacturing an optical disk, in Japanese Patent. Application KOKAI Publication No. 5-81701 which is a reference disclosing the technique forming the protective layer for protecting a given layer, there is disclosed a technique in which the protective layer and the resin layer are formed on a metal reflecting layer in order to prevent the metal reflecting layer from being separated from the substrate. In the optical disk, the laser beam is irradiated from the backside of the substrate to the recording layer and to record and reproduce the information.

However, since the optical disk shown by the reference is not the next-generation optical disk, the laser beam is irradiated from the backside of the substrate to the recording layer. Accordingly, unlike the optical disk according to one embodiment of the invention, the technique in which the light transmitting layer including the transparent sheet and a bonding layer is bonded to the substrate and is protected with sufficient strength, while transparency is retained, is not disclosed. Therefore, there is a problem that the light transmitting layer of the optical disk, in which the recording and the reproducing are performed by irradiating the laser beam from the frontside of the optical disk, can not be bonded and protected with the sufficient strength.

That is, according to the conventional manufacturing method, in the optical disk in which the recording and the reproducing are performed by irradiating the laser beam from the frontside of the optical disk, there is the problem that, while transparency is retained, the light transmitting layer including the transparent sheet and the bonding layer can not be bonded onto the substrate and protected with the sufficient strength.

BRIEF SUMMARY OF THE INVENTION

An embodiment of the present invention refers to an optical disk, which comprises a recording layer in which information provided on a substrate is recorded, a bonding layer which is made of an ultraviolet cured resin bonding at least the recording layer onto the substrate, a transparent sheet layer which is provided to be bonded on the bonding layer, an overcoating layer which is made of the ultraviolet cured resin and is formed on the transparent sheet layer, and a mixed layer which is formed continuously to the overcoating layer by mixture of the ultraviolet cured resins of the bonding layer and the overcoating layer.

DETAILED DESCRIPTION OF THE INVENTION

Figure 1:
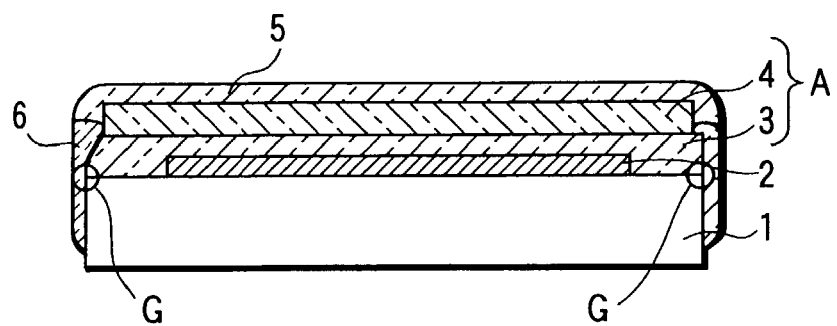
FIG. 1 is a longitudinal sectional view showing a first embodiment of an optical disk according to one embodiment of the invention.

Referring to the drawings, an optical disk and a method of manufacturing an optical disk will be described in detail below.

FIRST EMBODIMENT

A first embodiment provides the optical disk in which the light transmitting layer, which includes a bonding layer and a transparent sheet smaller than the substrate provided on the optical disk, is bonded and protected by the bonding layer, the overcoating layer, and the mixed layer of these materials, which are made of the ultraviolet cured resin. FIG. 1 is the longitudinal sectional view showing the first embodiment of the optical disk according to one embodiment of the invention, and the FIG. 9 is the longitudinal sectional view of a first optical disk which is a comparative example of the optical disk according to one embodiment of the invention.

Figure 9:
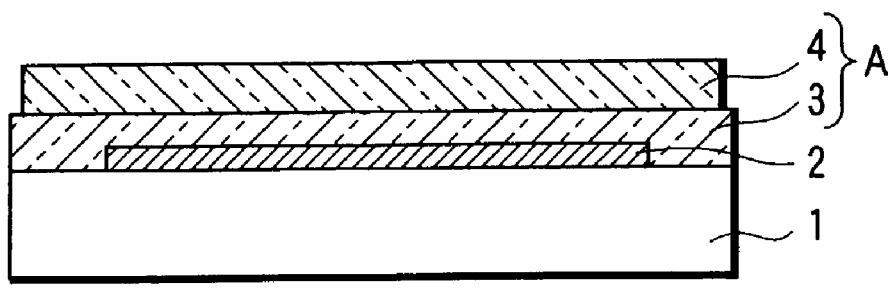
FIG. 9 is a longitudinal sectional view of a first optical disk which is a comparative example of the optical disk according to one embodiment of the invention.

FIG. 9 shows the optical disk in which the overcoating layer and the mixed layer according to one embodiment of the invention are not provided. In the optical disk shown in FIG. 9, an outer peripheral bonding face 7 of a substrate 1 and a transparent sheet 4 is liable to the separation from deformation of the substrate 1 and the transparent sheet 4, linear expansion, or plane shrinkage. Particularly this phenomenon tends to occur in high temperature and high humidity. This is because the materials of the substrate 1 and the protective layer differ in heat distortion properties, linear expansion coefficient, heat-shrinkable properties, and hygroscopic properties (water absorption coefficient). Further, since a distance from the outermost peripheral edge of the substrate 1 to a recording region is as very short as 1 mm, when once there is a portion where adhesion between the substrate 1 and a recording layer 2 is slightly bad, the separation propagates from the portion to the recording region to destroy a recording layer 2.

When the transparent sheet 4 having an about 100 μm thickness is bonded only by the ultraviolet cured resin, a step is easily generated in the outermost peripheral edge portion of the transparent sheet 4. On the other hand, when a crease of the sheet and the like in die-cutting are generated at an outer diameter edge face of the transparent sheet 4, adhesion is easily incomplete. This tends to result in intrusion of air and imperfect adhesion of the transparent sheet 4. In such case, since the protection of the recording layer 2 is not sufficiently performed due to the short distance to the recording region, the recording layer 2 is more liable to the separation. When regression caused by the separation is remarkable, the recording layer 2 is not completely covered by the transparent sheet 4 of the light transmitting layer, and sometimes part of the recording layer is exposed in air, so that durability of the recording layer 2 becomes insufficient.

In the optical disk according to the first embodiment of the invention, as shown in FIG. 1, an overcoating layer 5 made of the ultraviolet cured resin is formed on the transparent sheet 4, and a mixed layer 6 including the bonding layer 3 and the overcoating layer 5 is provided at least in the sectional face of the bonding layer 3 and a side face of the substrate. Herein, the transparent sheet 4 having the smaller diameter than that of the substrate 1 is used.

As described above, since both the bonding layer 3 and the overcoating layer 5 are the ultraviolet cured resin, the mixed layer 6 is easily formed in a mixed portion of the bonding layer 3 and the overcoating layer 5. The bonding layer 3, the overcoating layer 5, and the mixed layer 6 are integrally formed by the continuous ultraviolet cured resin, so that a bonded face "G" of the substrate 1 and the recording layer 2 is covered with mixed layer 6, and the recording layer 2 and the light transmitting layer "A" including the bonding layer 3 and the transparent sheet 4 are bonded with each other and are protected with extremely high strength. This was sufficiently confirmed by a durability test described later.

(Method of Manufacturing Optical Disk According to One Embodiment of the Invention)

Figure 12:
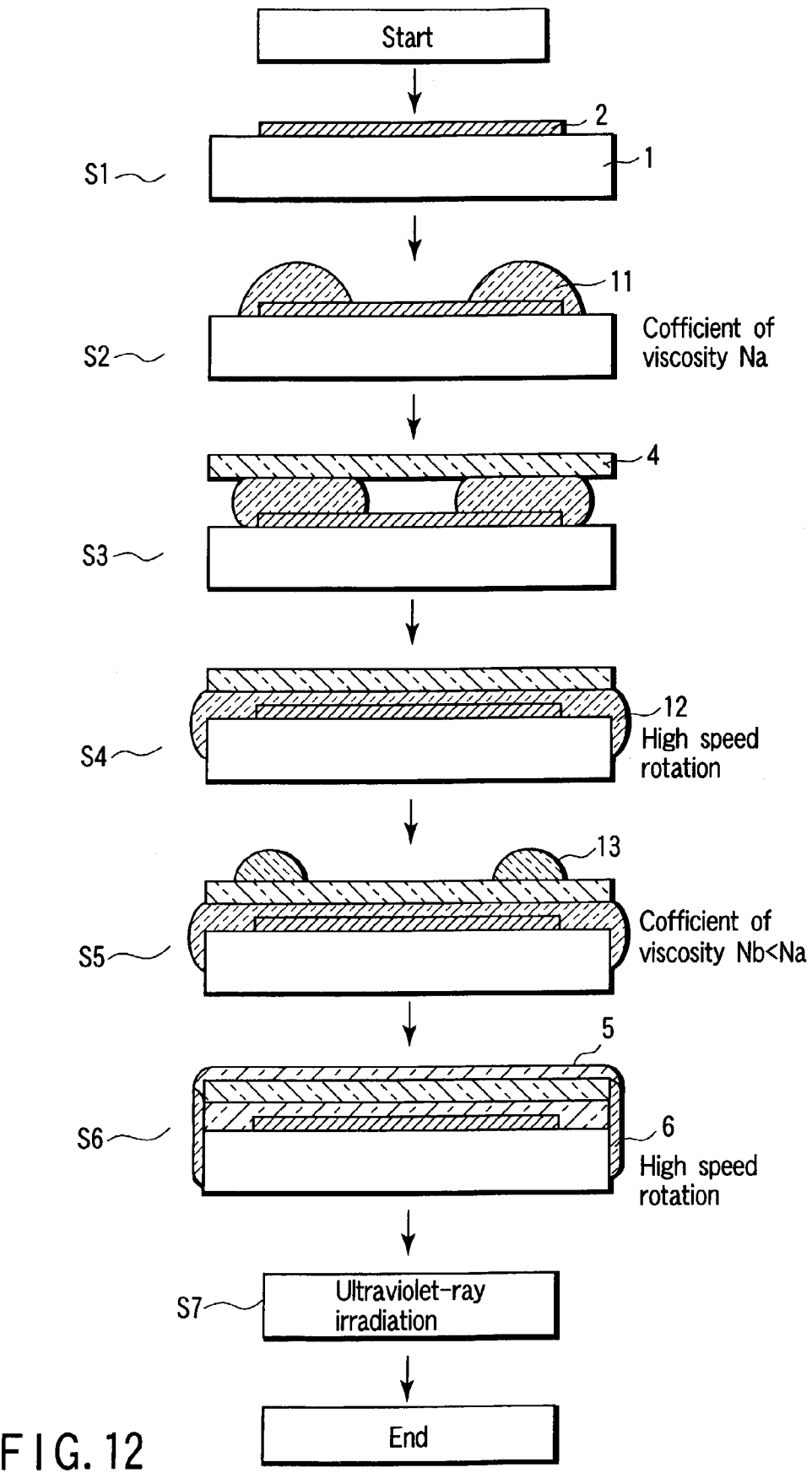
FIG. 12 is a flow chart explaining a process for manufacturing the optical disk according to one embodiment of the invention.

A method of manufacturing an optical disk according to one embodiment of the invention will be described in detail below by the use of a flow chart. FIG. 12 is the flow chart explaining a process for manufacturing the optical disk according to one embodiment of the invention.

In the optical disk according to one embodiment of the invention, the transparent substrate 1 (made of polycarbonate resin, the 120 mm diameter and the 1.1 mm thickness), which had the 1-mm-width and 0.5-mm-depth depression at the 22 mm diameter and the guide groove, was prepared in the flow chart shown in FIG. 12 (S1). Then, the recording layer 2 was formed on the substrate 1 with a magnetron sputtering apparatus. A metal reflecting film made of an AlMo alloy, a dielectric protective film made of ZnS and $SiO_2$, a phase change material film made of a GeSbTe alloy, and the above-described dielectric protective film are formed sequentially as the recording layer 2. Composition of the phase change material film is formed such that the composition has the good recording, erasing, and repeated recording/reproducing characteristics with the 405 nm wavelength and reflectivity difference between a crystal phase and an amorphous phase is enlarged. For the metal reflecting film, the composition is formed so as to have a function of improving the reflectivity of the phase change optical disk.

At this point, a mask having the 36 mm diameter is used as an inner radius mask and the mask having the 119 mm diameter is used as an outer radius mask. This is because the recording region is provided up to the neighborhood of the inner and outer radiuses so as not to reduce recording capacity as much as possible.

Then, ultraviolet cured type of adhesives 11 was applied onto the substrate 1 on which the recording layer 2 had been formed with a spin coating method (S2). At this point, viscosity of the adhesives 11 was set to $N_a$ by way of example. The previously prepared, doughnut-shaped transparent sheet 4 for light transmission having the 119 mm outer diameter, the 16 mm inner diameter, and the 0.1 mm thickness, which was slightly smaller than the substrate 1, was placed on the applied ultraviolet-cured type of adhesives 11 (S3). Immediately, the bonding layer 3 was formed between the recording layer 2 and the transparent sheet 4 by rotating a spindle of a spin coater to drain off the excess adhesives (S4). At this point, the adhesives 11 of the bonding layer 3 had an overflow portion 12.

Successively, an ultraviolet cured type of overcoating agent 13 was applied on the transparent sheet 4, which was fixed by the bonding layer 3, with the spin coating method (S5). At this point, by way of example, the viscosity of the overcoating agent 13 was set to the viscosity $N_b$ which was lower than that of the previous adhesives 11, however, the equal viscosity $N_a$ was also applicable to the overcoating agent 13. The overcoating layer 5 was formed on the transparent sheet 4, which was fixed by the bonding layer 3, by rotating a spindle of a spin coater to drain off the excess overcoating agent. Because the adhesives of the transparent sheet 4 for light transmission were also not cured, the adhesives were mixed with the overcoating agent in the same non-cured state at the outer peripheral portion, which resulted in the mixed layer 6 (S6). Then, by irradiating an ultraviolet ray from the side of the overcoating layer 5, the bonding layer and overcoating layer side 5 were cured to prepare the phase change optical disk (S7). The thicknesses of the bonding layer and the overcoating layer 5 were formed after curing in the range from 2 to 5 μm by controlling the number of revolutions of a turntable.

As a result, in the outer peripheral portion of the disk, the layer in which the adhesives and the overcoating agent are mixed is formed so as to go round to the side face of the substrate 1. Accordingly, the bonding layer 3, the overcoating layer 5, and the mixed layer 6 are integrated and cured with one ultraviolet irradiation, so that the substrate 1 is firmly protected by the ultraviolet cured resin which has been cured. As a result, the light transmitting layer "A" including the transparent layer 4 and the bonding layer 3 is protected with extremely high strength, it is sufficiently confirmed by the durability test described later.

It is preferable by way of example that the thickness of the optical disk is in the range from 1.0 mm to 1.2 mm and the thickness of the transparent sheet is in the range from 50 μm to 110 μm.

SECOND EMBODIMENT

Figure 2:
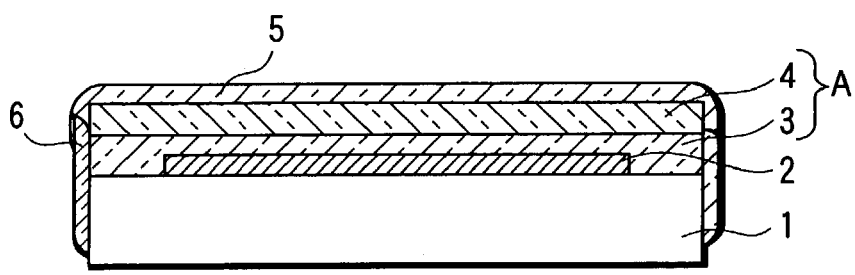
FIG. 2 is a longitudinal sectional view showing a second embodiment of the optical disk according to one embodiment of the invention.

A second embodiment provides the optical disk in which the light transmitting layer, which includes the bonding layer and the transparent sheet having the same diameter as that of the substrate provided on the optical disk, is bonded and protected by the bonding layer, the overcoating layer, and the mixed layer of these materials, which are made of the ultraviolet cured resin. FIG. 2 is the longitudinal view showing the second embodiment of the optical disk according to one embodiment of the invention.

In FIG. 2, the phase change optical disk was prepared in the same way as the first embodiment except that the transparent sheet 4 for light transmission having the same outer diameter of 120 mm as the substrate 1 was used. As a result, in most disks, the mixed layer in which the adhesives and the overcoating agent were mixed in the outer peripheral portion was formed so as to go round to the side face of the substrate 1.

Consequently, similarly to the first embodiment, the bonding layer 3, the overcoating layer 5, and the mixed layer 6 are integrally formed, so that the light transmitting layer "A" including the transparent layer 4 and the bonding layer 3 and the recording layer 2 can be bonded and protected with extremely high strength.

THIRD EMBODIMENT

Figure 3:
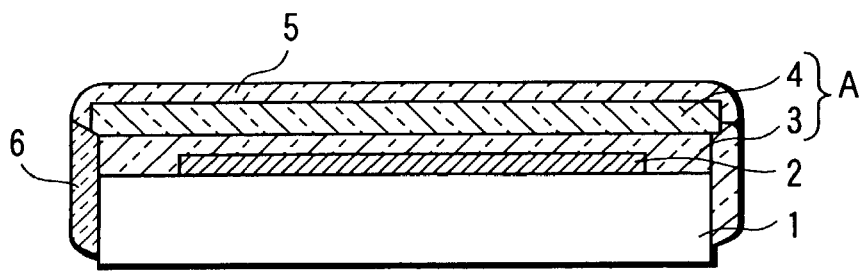
FIG. 3 is a longitudinal sectional view showing a third embodiment of the optical disk according to one embodiment of the invention.

A third embodiment provides the optical disk in which the light transmitting layer, which includes the bonding layer and the transparent sheet having the larger diameter than that of the substrate provided on the optical disk, is bonded and protected by the bonding layer, the overcoating layer, and the mixed layer of these materials, which are made of the ultraviolet cured resin. FIG. 3 is the longitudinal view showing the third embodiment of the optical disk according to one embodiment of the invention.

In FIG. 3, the phase change optical disk was prepared in the same way as the first embodiment except that the transparent sheet 4 for light transmission having the larger outer diameter of 121 mm than that of the substrate 1 was used. As a result, in most disks, the mixed layer in which the adhesives and the overcoating agent were mixed in the outer peripheral portion was formed so as to go round to the side face of the substrate 1. In the side face portion of the substrate 1, the projected portion of the transparent sheet 4 for light transmission is buried with the layer in which the adhesives and the overcoating agent are mixed.

Consequently, similarly to the first embodiment, the bonding layer 3, the overcoating layer 5, and the mixed layer 6 are integrally formed, so that the light transmitting layer "A" including the transparent sheet 4 and the bonding layer 3 and the recording layer 2 can be bonded and protected with extremely high strength.

FOURTH EMBODIMENT

Figure 4:
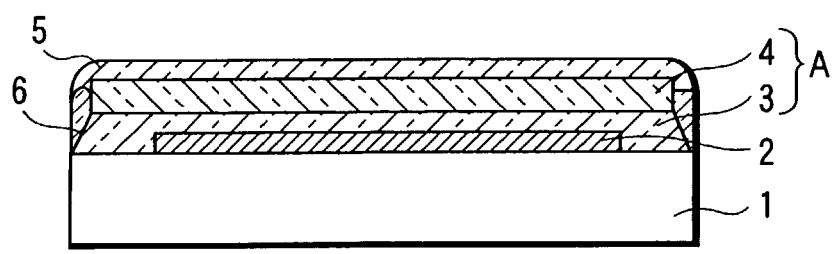
FIG. 4 is a longitudinal sectional view showing a fourth embodiment of the optical disk according to one embodiment of the invention.

A fourth embodiment provides the optical disk in which the side face of the substrate in the optical disk of the first embodiment, in which the light transmitting layer including the bonding layer and the transparent sheet smaller than the substrate provided on the optical disk is bonded and protected by the bonding layer, the overcoating layer, and the mixed layer of these materials which are made of the ultraviolet cured resin, is wiped off with a dust-free wiper to remove the mixed layer. FIG. 4 is the longitudinal view showing the fourth embodiment of the optical disk according to one embodiment of the invention.

In FIG. 4, the phase change optical disk was prepared in the same way as the first embodiment except that the side face of the substrate 1 was wiped off with the dust-free wiper after the overcoating agent layer was formed. In the side face of the outer peripheral portion of the disk, the adhesives and the overcoating agent were wiped off clean and there was no change in the shape such as the step.

Consequently, similarly to the first embodiment, the bonding layer 3, the overcoating layer 5, and the mixed layer 6 are integrally formed, so that the light transmitting layer "A" including the transparent layer 4 and the bonding layer 3 and the recording layer 2 can be bonded and protected with extremely high strength.

FIFTH EMBODIMENT

Figure 5:
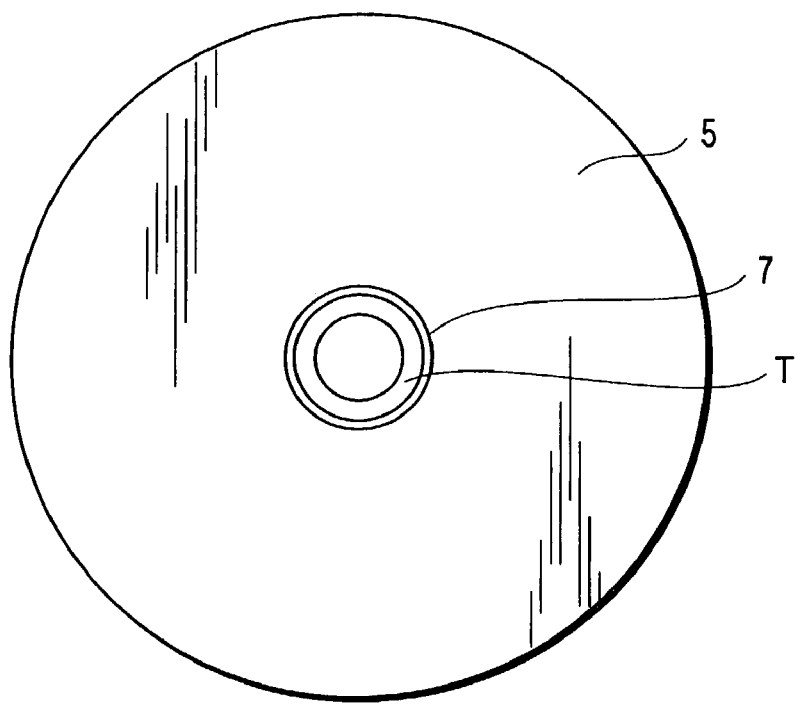
FIG. 5 is a top view showing a fifth embodiment of the optical disk according to one embodiment of the invention.
Figure 7:
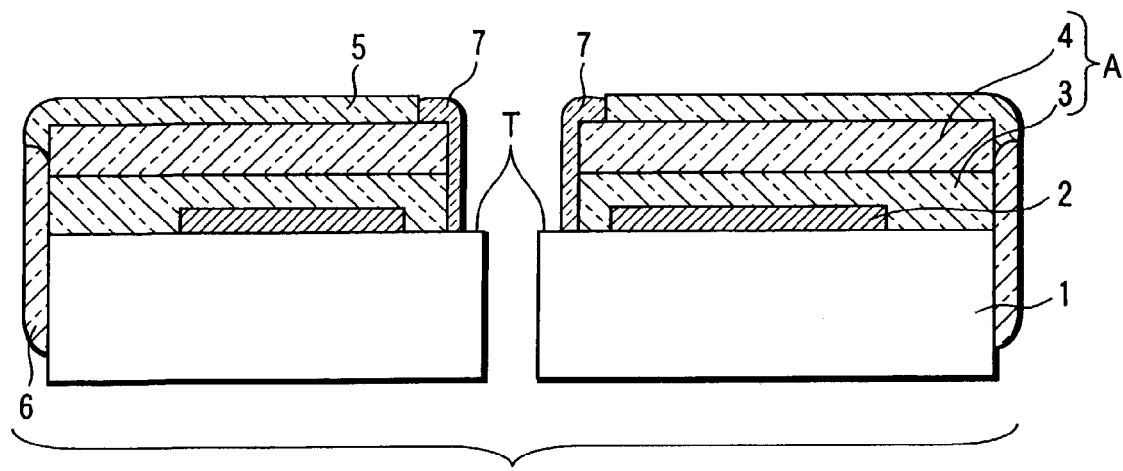
FIG. 7 is a sectional view showing a fifth embodiment of the optical disk according to one embodiment of the invention.

A fifth embodiment provides the optical disk, in which the separation caused by a touch of a shaft of a disk driver is avoided in such a manner that a central portion of the transparent sheet 4 provided on the optical disk is partially cut and, in the same way as the first embodiment and the like except that point, the optical disk is bonded and protected by the bonding layer, the overcoating layer, and the mixed layer of these materials which are made of the ultraviolet cured resin. FIG. 5 is the top view showing the fifth embodiment of the optical disk according to one embodiment of the invention, and FIG. 7 is a sectional view showing the fifth embodiment of the optical disk according to one embodiment of the invention.

In these figures, after the phase change optical disk was prepared in the same way as the first embodiment, a portion "T" of the transparent sheet 4, which had the diameter ranging from 16 mm to 21, was cut off, ultraviolet cured type of protective agent was applied in an end face, and the protective agent was cured with the ultraviolet irradiation to form the protective layer 7. As a result, the inner peripheral portion of the transparent sheet 4 is placed at more outside than that of the substrate 1, so that there is no sense of discomfort even if the inner peripheral portion is touched with a finger. In this way, by providing the protective layer 7 which covers the inner peripheral end portion of the transparent sheet 4, the hitch caused by the touch of the shaft of the disk driver and the like can be released in the inner peripheral portion and the separation of the transparent sheet 4, which is caused by the hitch, can be prevented.

SIXTH EMBODIMENT

Figure 6:
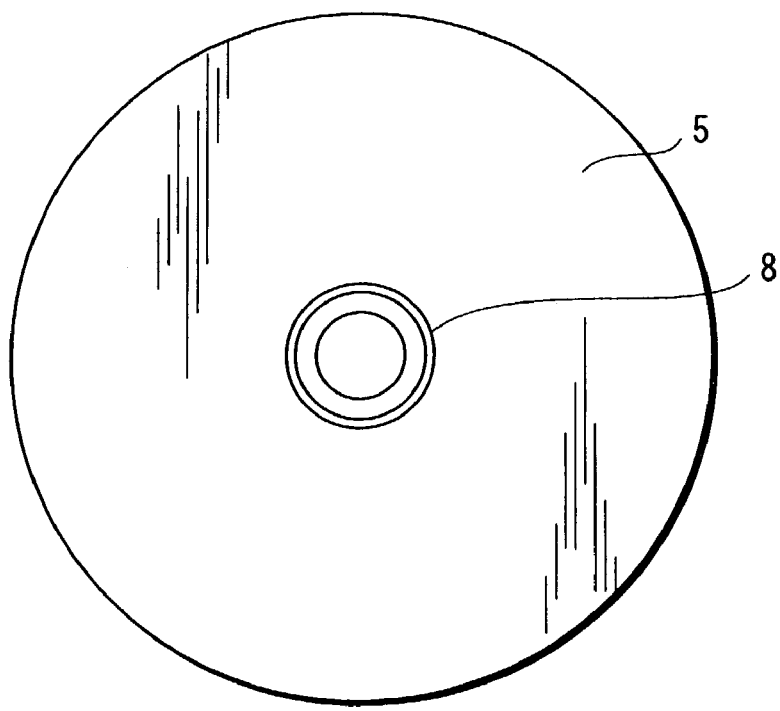
FIG. 6 is a top view showing a sixth embodiment of the optical disk according to one embodiment of the invention.
Figure 8:
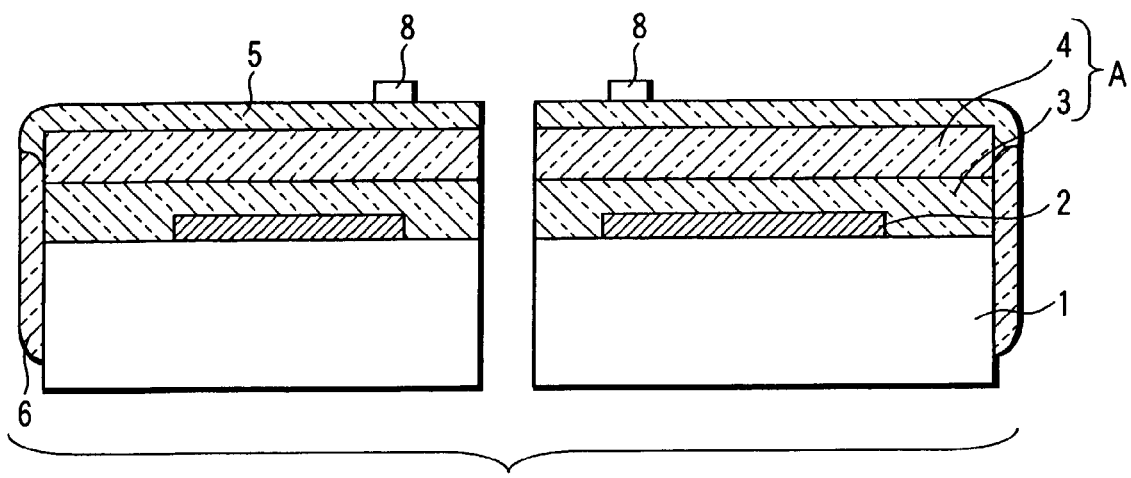
FIG. 8 is a sectional view showing a sixth embodiment of the optical disk according to one embodiment of the invention.

A sixth embodiment provides the optical disk, in which adhesion between the optical disks is prevented to suppress the separation in such a manner that a ring-shaped sheet is provided as a spacer on the optical disk and, in the same way as the first embodiment and the like except that point, the optical disk is bonded and protected by the bonding layer, the overcoating layer, and the mixed layer of these materials which are made of the ultraviolet cured resin. FIG. 6 is the top view showing the sixth embodiment of the optical disk according to one embodiment of the invention, and FIG. 8 is a sectional view showing the sixth embodiment of the optical disk according to one embodiment of the invention.

In these figures, after the phase change optical disk was prepared in the same way as the first embodiment, a sheet layer 8 having the 38-mm-outer-diameter, the 35-mm-inner-diameter, and the 0.1-mm-thickness was concentrically bonded on the overcoating layer 5 by the adhesives. This enables the adhesion of each substrate to be prevented, even if each substrate is stacked in a stacking jig.

In the sixth embodiment, the ring-shaped sheet 6 is concentrically bonded to the optical disk with the adhesives, so that the adhesion between the optical disks can be prevented and the separation of the light transmitting layer A can be prevented in the handling.

(Durability Test)

Figure 10:
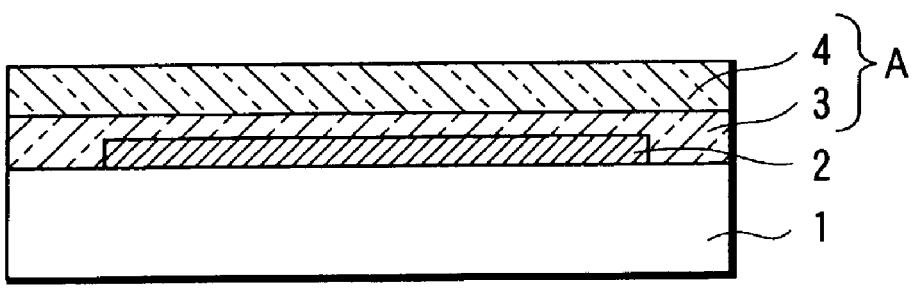
FIG. 10 is a longitudinal sectional view of a second optical disk which is a comparative example of the optical disk according to one embodiment of the invention.
Figure 11:
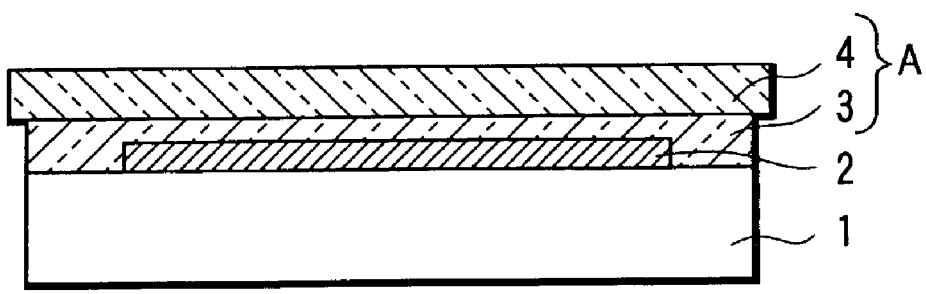
FIG. 11 is a longitudinal sectional view of a third optical disk which is a comparative example of the optical disk according to one embodiment of the invention.

In order to confirm advantage of the optical disk according to one embodiment of the invention, the durability test has been performed for (1) drop test and (2) environmental test in the optical disks according to the first to fourth embodiments and the corresponding optical disks of a comparative example 1 to a comparative example 3 in which the overcoating layer are not provided, as shown in FIGS. 9 to 11. Details of the comparative examples 1 to 3 and each test result are shown as follows.

COMPARATIVE EXAMPLE 1

FIG. 9 is the longitudinal sectional view of a first optical disk which is a comparative example of the optical disk according to one embodiment of the invention. In the first optical disk, the light transmitting layer "A" was formed in the same way as the first embodiment except that the ultraviolet cured type of overcoating agent was not applied.

As a result, in the light transmitting layer "A", the step was generated in the outermost peripheral end of the substrate 1. Therefore, it was found a phenomenon in which the light transmitting layer A was easily liable to the separation from the hitch at the step portion in the handling.

COMPARATIVE EXAMPLE 2

FIG. 10 is the longitudinal sectional view of a second optical disk which is a comparative example of the optical disk according to one embodiment of the invention. The phase change optical disk was formed in the same way as the second embodiment except that the ultraviolet cured type of overcoating agent was not applied. As a result, the end face of the outermost periphery in the light transmitting layer "A" was flush with the end face of the outermost periphery of the substrate 1. Therefore, it was confirmed the phenomenon in which the light transmitting layer "A" was easily susceptible to the separation from the hitch at the end face portion of the outermost periphery in the transparent sheet 4 in the handling, because the end face portion of the outermost periphery in the transparent sheet 4 constituting the light transmitting layer "A" was an acute angle. Further, as shown in the second embodiment, since the end face of the outermost periphery in the light transmitting layer "A" was not protected by the overcoating layer, the end face portion of the outermost periphery having the acute angle in the transparent sheet 4 constituting the light transmitting layer A was exposed, so that it can be referred that safety was low in the handling.

COMPARATIVE EXAMPLE 3

FIG. 11 is the longitudinal sectional view of a third optical disk which is a comparative example of the optical disk according to one embodiment of the invention. The phase change optical disk was formed in the same way as the third embodiment except that the ultraviolet cured type of overcoating agent was not applied. At this point, the projected portion of the transparent sheet 4 was generated in the side face portion of the substrate 1. The shape shown in FIG. 11 referred to a state in which the separation of the transparent sheet 4 was easier than that of the shape shown in FIG. 9 because the hitch occurred easily at the projected portion of the transparent sheet 4.

(1) Drop Test

High-impact resistance of the disk was examined in such a manner that the optical disks of the first to fourth embodiments and the optical disks of the first to third comparative examples were dropped from 1 meter above the ground to a concrete floor so that the end face of the outer periphery was vertically hit.

The separation of the light transmitting layer "A" was not found in any optical disk among the optical disks of the first to fourth embodiments. On the other hand, in the optical disk of the comparative example 1, the separation of the light transmitting layer A was found in the outer peripheral portion of the substrate 1, particularly in the optical disks of the second and third comparative examples, it was confirmed that the light transmitting layer "A" became separated up to the recording region of the recording layer 2 and the recording layer 2 was broken.

As described above, in the optical disks of the first to fourth embodiments according to one embodiment of the invention, it was able to be confirmed from the experiment that the high-impact resistance was greatly improved.

(2) Environmental Test

The change in the shape of the optical disk was examined in such a manner that the environmental test at 80° C. and 90% RH for about 1000 hours was conducted for the optical disks of the first to fourth embodiments and the optical disks of the first to third comparative examples.

The change in the shape was not found by a visible check in the optical disks of the first to fourth embodiments. On the other hand, in the optical disk of the comparative example 1, the separation of the light transmitting layer "A" was found in the outer peripheral portion of the substrate 1, particularly in the optical disks of the second and third comparative examples, it was confirmed that the separation of the light transmitting layer "A" proceeded up to the recording region of the recording layer 2, and corrosion of the recording layer 2 was confirmed.

As described above, in the optical disks of the first to fourth embodiments according to one embodiment of the invention, it was able to be confirmed that corrosion resistance was greatly improved, compared with the optical disk of the first to third comparative examples.

Though those skilled in the art can realize the invention from various embodiments described above, those skilled in the art can easily conceive further various modifications of the embodiments and apply the invention to various embodiments without inventive ability. Accordingly, the invention covers a wide range which is not contradictory to the disclosed principle and novel characteristics, and is not limited to the above-described embodiments.

For example, though the optical disk for the recording/reproducing was described in the above-described embodiments, the invention can also be applied to the compact disk-read only memory. In this case, the recording layer 2 is formed by a simplex of the light reflecting film made of Al, an AlMo alloy, or the like.

As described above in detail, the invention provides the optical disk, in which the mixed layer in which the ultraviolet cured resins of the bonding layer of the transparent sheet and the overcoating layer are mixed, is formed, so that the bonding layer, the overcoating layer, and the mixed layer are integrally cured. As a result, the substrate is entirely covered by the ultraviolet cured resin having the transparency, and the light transmitting layer including the transparent sheet and the bonding layer is protected with the sufficient strength.

The advantages of the high-impact resistance and the corrosion resistance of the invention were sufficiently confirmed by the comparative experimental for (1) drop test and (2) environmental test.

What is claimed is:

1. An optical disk comprising:
   a recording layer which is provided on a substrate and in which information is recorded;
   a bonding layer which is made of an ultraviolet cured resin bonding at least the recording layer on the substrate;
   a transparent sheet layer which is provided to be bonded on the bonding layer;
   an overcoating layer which is formed on the transparent sheet layer and is made of the ultraviolet cured resin; and
   a mixed layer which is continuously formed in the overcoating layer in such a manner that the ultraviolet cured resin of the bonding layer and the overcoating layer are mixed.

2. The optical disk according to claim 1, wherein the bonding layer is formed by the ultraviolet cured resin having a first viscosity, and the overcoating layer is formed by the ultraviolet cured resin having a second viscosity which is lower than the first viscosity.

3. The optical disk according to claim 1, wherein a thickness of the substrate is in the range from 1.0 mm to 1.2 mm, and a thickness of the transparent sheet is in the range from 50 μm to 100 μm.

4. The optical disk according to claim 1, wherein a diameter of the transparent sheet is smaller than the diameter of the substrate.

5. The optical disk according to claim 1, wherein the diameter of the transparent sheet is equal to the diameter of the substrate.

6. The optical disk according to claim 1, wherein the diameter of the transparent sheet is larger than the diameter of the substrate.

7. The optical disk according to claim 1, wherein the mixed layer is formed on side faces of the bonding layer and the transparent layer is not formed on the side face of the substrate.

8. The optical disk according to claim 1, further comprising a protective layer which is made of the ultraviolet cured resin and covers the side face of a through hole which is provided in the center of the disk and at least a cut face of the transparent sheet.

9. The optical disk according to claim 1, wherein a ring-shaped sheet layer is further provided on the overcoating layer in a concentric circle of the through hole which is provided in the center of the disk.

\* \* \* \* \*